June 17, 1952     J. J. DOMOJ ET AL     2,600,395

KEYHOLE SPLICE

Filed June 1, 1951

INVENTORS
JOHN JOSEPH DOMOJ
BY SIDNEY ROSENBERG

ATTORNEYS

Patented June 17, 1952

2,600,395

UNITED STATES PATENT OFFICE 2,600,395

KEYHOLE SPLICE

John Joseph Domoj, Medina, N. Y., and Sidney Rosenberg, Philadelphia, Pa.

Application June 1, 1951, Serial No. 229,468

5 Claims. (Cl. 87—13)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

The present invention pertains to the art of cordage, and it comprises a novel terminal eye of a cord or strand, as also a novel method of producing the same.

The terminal eye of the present invention is of simple, low cost structure, but its strength and stability is nevertheless as high as prior art terminal eyes embodying much more complex and costly structure.

Figure 2:
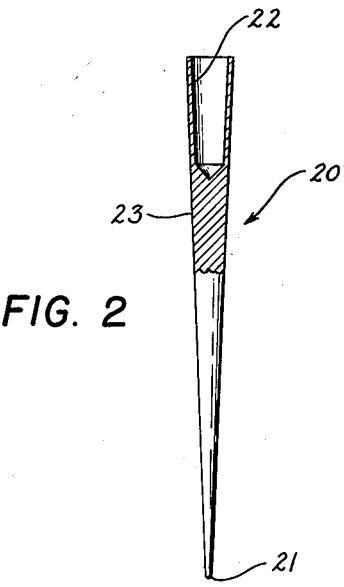
Figure 1:
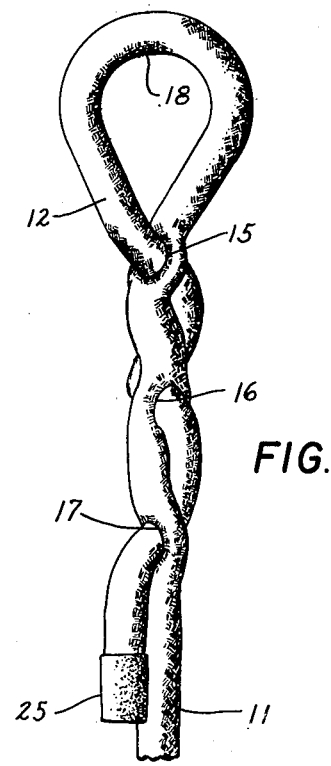
Figure 3:
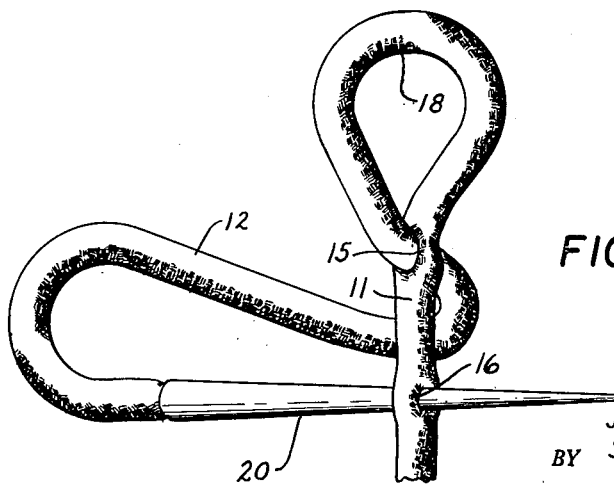

Principles of the invention, and the structure, and the manner of producing one practical embodiment thereof, will be clear from the accompanying drawing to which attention is now directed. In the drawing Fig. 1 is an elevation of a terminal eye embodying the invention, Fig. 2 is an elevation of an instrument that facilitates producing the terminal eye of Fig. 1, and Fig. 3 is an elevation illustrating the terminal eye of Fig. 1 at one step in its process of production.

The terminal eye of the invention is produced by forming the strand near its end into a bite of which the main length 11 and the terminal length 12 respectively constitute the several two legs of the bite. The terminal length 12 is projected to penetrate through the thickness of the main length 11 at 15, and is additionally similarly projected to penetrate through the thickness of the main length 11 at the points 16 and 17 in succession. The point 15 is located along the main length 11 in the direction away from the fold 18 of the bite 11, 12 the distance that is required for the desired size of the terminal eye. Points 15, 16 and 17 are located spaced apart from each other along the main length 11, with respective points of penetration 16 and 17 located progressively greater distances from the fold 18.

The distance along strand 11 between adjacent points of penetration 15, 16 and 17 may vary within wide limits, and spacings about three or four times the thickness of the strand have been used and found suitable. Adjacent penetrations 15, 16 and 17 are angularly displaced with reference to each other around the axis of strand 11, angular displacements of successive penetrations preferably being in the same direction. The strand material of the terminal leg 12 is drawn through the penetrations 16 and 17 to an extent to position the strand material of the main and terminal lengths 11 and 12 between penetrations closely side-by-side. Thus, the total thickness of the strand material of the terminal eye is reduced to a minimum.

The invention is particularly applicable for strands having braided sheath as shown.

The instrument 20 is provided to facilitate forming the splice of the terminal eye. The instrument 20 comprises a point 21 at its one end, the axial socket 22 at its other end, and the shank 23 which tapers smoothly, continuously from the point 21 to the socket 22.

The strand end 25 of the terminal length 12 is preferably treated to prevent its fraying, one suitable structure being to wrap the strand end 25 with friction tape. Socket 22 of the instrument 20 is sized to fit the treated strand end 25.

To fabricate the terminal eye of the present invention, the pointed end 21 of the instrument 20 is projected to penetrate through the thickness of the main length 11 at the point 15, the position of the point 15 of penetration along the strand being determined by the desired size of the terminal eye and the amount of terminal length 12 required to form the splice. The treated strand end 25 of the terminal length 12 is seated in the socket 22 before the instrument 20 is pulled through the main length 11, and the treated end 25 and the terminal length 12 are drawn through the main length 11 at 15 by the instrument 20 being projected all the way through. The terminal length 12 is now drawn through the main length 11 at 15 to the extent required to produce the desired size of eye.

The instrument 20 is now projected into and penetrated through the thickness of the main length 11 in a similar manner at the point 16 along the length 11, and the terminal length 12 is driven through at 16 similarly by and with the instrument 20.

The main length 11 is given at least a quarter-turn for penetration 16 after penetration 15, so that the pentrations 16 and 15 are angularly displaced 90° or more with reference to each other around the axis of strand 11.

The penetration at point 17 along the main length 11 is made in the same manner as penetrations 15 and 16 already described, and is displaced angularly 90° or more with reference to penetration 16 around the axis of the main length 11, the angular displacement of penetration 17 with reference to 16 being in the same direction as penetration 16 with reference to 15.

After penetration 16 is made, the terminal length 12 is drawn through main length 11 at 16 by an amount to equalize the strand extent of lengths 11 and 12 between penetrations 15 and 16. This positions the two strands side-by-side spirally of each other between penetrations 16 and 17. At 17, the terminal length 12 is drawn through main length 11 similarly to position the two strands side-by-side spirally of each other between penetrations 16 and 17.

There may be additional penetrations after 17 is completed, but the three penetrations 15, 16 and 17 hereinbefore described have proven sufficient for practice of the invention to produce a terminal eye having strength comparable with the strength of strand 11. Under test, the splice of penetrations 15, 16 and 17 as hereinbefore described is at least 90% as strong as the strand 11.

When the last penetration 17 is completed, the instrument 20 is removed from the treated strand end 25, which lies alongside the main length 11 as illustrated in Fig. 1. The extent of strand of terminal length 12 from strand end 25 to the penetration 17 is determined before the terminal eye is formed by the original extent of the terminal length 12 from the fold 18 to the treated end 25.

The disclosure presents one practical application of the invention, which is not limited to the specifically disclosed embodiment. The invention is limited by the accompanying claims.

We claim:

1. In the terminal eye of a strand, a bite of the strand comprising respective main and terminal lengths thereof forming the several legs of the bite, the terminal length being projected to penetrate through the thickness of the main length at a plurality of points in succession spaced apart along the main length, adjacent penetrations of the terminal length through the main length being angularly displaced with reference to each other around the axis of the main length, angular displacements of successive penetrations being in the same direction, portions of the strand in the main and terminal lengths between adjacent penetrations being positioned closely side-by-side.

2. In a terminal eye as defined in claim 1, the angular displacement between adjacent penetrations being at least a quarter turn.

3. In the terminal eye of a strand embodying a braided sheath, a bite of the strand comprising respective main and terminal lengths thereof forming the several legs of the bite, the terminal length being projected to penetrate through the thickness of the main length at a plurality of points in succession spaced apart along the main length, successive penetrations of the terminal length through the main length being angularly displaced with reference to each other around the axis of the main length, angular displacements of successive penetrations being in the same direction, portions of the strand in the main and terminal lengths between adjacent penetrations being positioned closely side-by-side.

4. The method of fabricating a terminal eye of a strand comprising forming a bite of the strand with respective main and terminal lengths thereof constituting the several legs of the bite, projecting the terminal length through the thickness of the main length at a point along the main length spaced away from the fold of the bite the required distance for the desired size of eye, penetrating the terminal length through the main length at a plurality of points along the main length spaced apart from each other and successively spaced away from the fold of the bite greater distances, positioning adjacent penetrations at points angularly displaced with reference to each other around the axis of the main length, making angular displacements of successive penetrations around the axis of the main strand in the same direction, drawing the terminal length through successive penetrations of the main length sufficiently for the main and terminal lengths to be positioned closely side-by-side between adjacent penetrations.

5. In the method as defined in claim 4, treating the strand end of the terminal length to prevent its fraying, providing an instrument comprising a point at its one end, an axial socket at its other end sized to fit the treated strand end, and a tapered shank extending from the point end to the socket end, for producing each of the several penetrations projecting the point of the instrument through the thickness of the main length and with the strand end of the terminal length seated in the socket of the instrument drawing the terminal length through the penetration of the main length after the instrument, and removing the instrument from the strand end of the terminal length leaving the treated end thereof attached when the terminal eye is completed.

JOHN JOSEPH DOMOJ.
SIDNEY ROSENBERG.

REFERENCES CITED

The following references are of record in the file of this patent:

UNITED STATES PATENTS

| Number | Name | Date |
| --- | --- | --- |
| 338,216 | Atwood | Mar. 16, 1886 |
| 1,967,102 | Schlegel | July 17, 1934 |
| 2,549,382 | Mitterway | Apr. 17, 1951 |